United States Patent
Jiménez et al.

(10) Patent No.: US 10,051,561 B2
(45) Date of Patent: Aug. 14, 2018

(54) METHODS AND NODES FOR M2M COMMUNICATION

(71) Applicant: Telefonaktiebolaget LM Ericsson (publ), Stockholm (SE)

(72) Inventors: Jaime Jiménez, Helsinki (FI); Nicklas Beijar, Kirkkonummi (FI); Oscar Novo Diaz, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/521,637

(22) PCT Filed: Dec. 2, 2014

(86) PCT No.: PCT/SE2014/051435
§ 371 (c)(1),
(2) Date: Apr. 25, 2017

(87) PCT Pub. No.: WO2016/089262
PCT Pub. Date: Jun. 9, 2016

(65) Prior Publication Data
US 2017/0251428 A1 Aug. 31, 2017

(51) Int. Cl.
*H04W 4/00* (2018.01)
*H04W 48/20* (2009.01)
(Continued)

(52) U.S. Cl.
CPC .......... *H04W 48/20* (2013.01); *H04W 4/70* (2018.02); *H04W 48/14* (2013.01); *H04W 48/16* (2013.01)

(58) Field of Classification Search
CPC .......... H04L 4/70; H04W 48/14; H04W 48/16
(Continued)

(56) References Cited

U.S. PATENT DOCUMENTS

| 2009/0278705 A1 | 11/2009 | Chhabra et al. |
| 2011/0286437 A1 | 11/2011 | Austin et al. |

(Continued)

FOREIGN PATENT DOCUMENTS

| EP | 1365557 A2 * | 11/2003 | ............ H04L 29/06 |
| EP | 2824870 A1 | 1/2015 | |

(Continued)

OTHER PUBLICATIONS

Shelby, Z. et al., "The Constrained Application Protocol (CoAP)", Internet Engineering Task Force (IETF), Request for Comments: 7252, Category: Standards Track, ISSN: 2070-1721, Jun. 2014, pp. 1-112.

(Continued)

*Primary Examiner* — Thai Hoang
(74) *Attorney, Agent, or Firm* — Coats & Bennett, PLLC

(57) ABSTRACT

A machine device (100), a Machine-to-Machine, M2M, server (102) and methods therein are provided, where the machine device (100) connects to a wireless access gateway (GW1) in order to perform an M2M communication. The machine device (100) detects (1:1) a set of reachable wireless access gateways (GW1-GW4) with which the machine device (100) is able to reach for communication using short range wireless technology, and sends (1:2) identifiers of the reachable wireless access gateways to the M2M server (102). The M2M server (102) then sends (1:4) an indication of at least one prioritized wireless access gateway (GW1, GW2) selected (1:3) from the reachable wireless access gateways. Thereby, the machine device (100) is able to connect (1:5) to one of the prioritized wireless access gateway(s) (GW1) for performing the M2M communication provided that this wireless access gateway is available.

34 Claims, 4 Drawing Sheets

(51) Int. Cl.
*H04W 48/14* (2009.01)
*H04W 48/16* (2009.01)
*H04W 4/70* (2018.01)

(58) Field of Classification Search
USPC .................. 370/329–330, 338; 709/227–229
See application file for complete search history.

(56) References Cited

U.S. PATENT DOCUMENTS

| 2012/0287854 | A1* | 11/2012 | Xie ....................... H04W 48/08 370/328 |
| 2013/0070641 | A1 | 3/2013 | Meier et al. |
| 2014/0129672 | A1* | 5/2014 | Singh ................ H04W 52/0216 709/217 |
| 2015/0143472 | A1* | 5/2015 | Kim ..................... H04W 48/02 726/4 |
| 2016/0014679 | A1* | 1/2016 | Taneja ................... H04W 4/70 455/434 |
| 2016/0112256 | A1* | 4/2016 | Papageorgiou ..... H04L 41/0823 709/222 |
| 2017/0208612 | A1* | 7/2017 | Tushar .................... H04W 4/70 |
| 2018/0115467 | A1* | 4/2018 | Li ........................... H04W 4/70 |

FOREIGN PATENT DOCUMENTS

| KR | 20140113007 A | * | 9/2014 |
| WO | 2013152633 A1 | | 10/2013 |

OTHER PUBLICATIONS

Open Mobile Alliance, "Lightweight Machine to Machine Requirements, Candidate Version 1.0", OMA-RD-LightweightM2M-V1_0-20131210-C, Dec. 10, 2013, pp. 1-19.

Open Mobile Alliance, "Lightweight Machine to Machine Technical Specification, Candidate Version 1.0", OMA-TS-LightweightM2M-V1_0-20131210-C, Dec. 10, 2013, pp. 1-104.

* cited by examiner

METHODS AND NODES FOR M2M COMMUNICATION

TECHNICAL FIELD

The present disclosure relates generally to a machine device, a Machine-to-Machine, M2M, server and methods therein, for allowing the machine device to connect to a wireless access gateway in order to perform a Machine-to-Machine, M2M, communication in a network.

BACKGROUND

In recent years, operation of wireless communication devices has increased significantly resulting in a corresponding increase of the demand for capacity in wireless communication networks to enable the devices to communicate as desired. In particular, the number of so-called Machine-to-Machine, M2M, communications has increased dramatically and will continue to do so for some time as more "intelligence" is introduced in various apparatus and environments. For example, various sensor functions are used extensively for remote surveillance and control of different apparatuses and equipment. Sensor devices and similar typically exchange information and messages with a central server, e.g. for delivering measurements and observations to the server and for receiving control messages and data from the server.

The term "connected devices" is commonly used in this field to denote any wireless devices which perform M2M communications frequently and automatically. In order to enable such extensive communication with a huge amount of wireless devices, including M2M devices as well as various mobile phones, smartphones and tablets, the M2M communications need to be executed with great efficiency in terms of, e.g., network bandwidth, computing power, memory capacity, battery consumption, to mention some illustrative examples. "Constrained networks" is also a term that is used to denote networks which attempt to minimize and/or optimize the above factors. M2M communications are often executed when the device is connected to a wireless access gateway using short range wireless technology based on, e.g., WiFi or Bluetooth, as opposed to radio communication over more extended distances such as in macro cells of a cellular network, and this description refers to such short range wireless communication.

A new standard has also been defined called Open Mobile Alliance Lightweight M2M, or OMA LWM2M for short, which is an efficient protocol for device management in M2M based networks. For example, the so-called Constrained Application Protocol, CoAP, can be used as a variant of Internet's well-known Hypertext Transfer Protocol, HTTP, for M2M communication of data and messages to and from wireless devices.

OMA LWM2M defines three logical components as follows:
- The LWM2M Server that manages LWM2M Clients or devices.
- The LWM2M Client which is a machine device that contains various Objects with different Resources. It executes commands sent by the LWM2M Servers and reports resource information for device management and service enablement.
- The LWM2M Bootstrap Server which is used during bootstrap procedures for initial configuration of the LWM2M Clients. This is useful when bootstrap is initiated by a LWM2M client having only a factory configuration.

Four interfaces between these logical components are also defined in OMA LWM2M as follows:
- Bootstrap: used by the LWM2M Bootstrap Server to set initial configurations on the LWM2M Client.
- Client Registration: enables a LWM2M Client to register with one or more LWM2M servers after the above bootstrapping of the LWM2M Client.
- Device Management and Service Enablement: allows the LWM2M Server to perform device management and M2M service enablement. Over this interface, the LWM2M Server can send operations to the LWM2M Client and get response of the operations from the LWM2M Client.
- Information Reporting: this interface allows the LWM2M Client to report resource information to the LWM2M Server in the form of Notifications or the like. The Information Reporting can be triggered periodically or by events depending of the logic in the LWM2M client.

In the following disclosure, the term "machine device" is used to represent any wireless device capable of performing an M2M communication in connection with a wireless access gateway using short range wireless technology based on, e.g., WiFi or Bluetooth. Further, a "wireless access gateway" denotes a point of wireless connection for the machine devices in the M2M communication.

However, there is currently no way of controlling how the machine devices connect to different wireless access gateways and a wireless access gateway is basically selected for a machine device either randomly by the machine device or manually by its user. As a result, the selected wireless access gateway may not be optimal for the machine device to use with respect to performance and network utilization. The above issues are particularly significant as the gateway used needs to be located fairly close to the machine device to enable short range communication, and the device therefore needs to change its connection from time to time e.g. when it is moved or when any wireless access gateways are moved, reconfigured or shut down, or when new ones are installed.

SUMMARY

It is an object of embodiments described herein to address at least some of the problems and issues outlined above. It is possible to achieve this object and others by using a machine device, a Machine-to-Machine, M2M, server and methods therein as defined in the attached independent claims.

According to one aspect, a method is performed by a machine device for connecting to a wireless access gateway in order to perform a Machine-to-Machine, M2M, communication in a network. In this method, the machine device detects a set of reachable wireless access gateways which the machine device is able to reach for communication using short range wireless technology. The machine device then sends identifiers of the reachable wireless access gateways to an M2M server, which identifiers may be network addresses or the like. The machine device further receives from the M2M server an indication of at least one prioritized wireless access gateway selected from the reachable wireless access gateways, and connects to one of the at least one prioritized wireless access gateway for performing the M2M communication provided that this wireless access gateway is available.

According to another aspect, a machine device is arranged to connect to a wireless access gateway in order to perform a Machine-to-Machine, M2M, communication in a network. The machine device comprises means configured to detect a set of reachable wireless access gateways which the machine device is able to reach for communication using short range wireless technology. This detecting operation may be performed by a detecting module in the machine device. The machine device also comprises means configured to send identifiers of the reachable wireless access gateways to an M2M server. This sending operation may be performed by a sending module in the machine device.

The machine device also comprises means configured to receive from the M2M server an indication of at least one prioritized wireless access gateway selected from the reachable wireless access gateways. This receiving operation may be performed by a receiving module in the machine device. The machine device also comprises means configured to connect to one of the at least one prioritized wireless access gateway for performing the M2M communication, provided that this wireless access gateway is available. This connecting operation may be performed by a connecting module in the machine device.

According to another aspect, a method is performed by a Machine-to-Machine, M2M, server for enabling a machine device to connect to a wireless access gateway in order to perform an M2M communication in a network. In this method the M2M server receives from the machine device identifiers of a set of reachable wireless access gateways which the machine device is able to reach for communication using short range wireless technology, which identifiers may be network addresses or the like. The M2M server then selects, from the reachable wireless access gateways, at least one wireless access gateway as being prioritized, based on a current state of the reachable wireless access gateways. The M2M server further sends an indication of the selected at least one prioritized wireless access gateway to the machine device, thereby enabling the machine device to connect to one of the at least one prioritized wireless access gateway for performing the M2M communication provided that this wireless access gateway is available.

According to another aspect, an M2M server is arranged to enable a machine device to connect to a wireless access gateway in order to perform an M2M communication in a network. The M2M server comprises means configured to receive from the machine device identifiers of a set of reachable wireless access gateways which the machine device is able to reach for communication using short range wireless technology. This receiving operation may be performed by a receiving module in the M2M server. The M2M server also comprises means configured to select at least one wireless access gateway from the reachable wireless access gateways as prioritized, based on a current state of the reachable wireless access gateways. This selecting operation may be performed by a selecting module in the M2M server.

The M2M server further comprises means configured to send an indication of the selected at least one prioritized wireless access gateway to the machine device, thereby enabling the machine device to connect to one of the at least one prioritized wireless access gateway for performing the M2M communication provided that this wireless access gateway is available. This sending operation may be performed by a sending module in the M2M server.

By using the above methods and nodes, the M2M server is able to control which wireless access gateway the machine device will connect to for performing the M2M communication, by indicating the at least one prioritized wireless access gateway to the machine device. For example, the M2M server may select prioritized wireless access gateways in consideration of various constraints that different wireless access gateways may have, e.g. related to access control restrictions, capability, capacity and current traffic load. The above methods and nodes may be configured and implemented according to different optional embodiments to accomplish further features and benefits, to be described below.

A computer program is also provided comprising instructions which, when executed on at least one processor in either of the machine device and the M2M server, cause the at least one processor to carry out the respective method described above for the machine device and M2M server. A carrier is also provided which contains the above computer program, wherein the carrier is one of an electronic signal, optical signal, radio signal, or a non-tangible computer readable storage medium.

BRIEF DESCRIPTION OF DRAWINGS

The solution will now be described in more detail by means of exemplary embodiments and with reference to the accompanying drawings, in which.

DETAILED DESCRIPTION

Briefly described, a solution is presented that allows a central server or the equivalent, denoted M2M server in the following description, to control how machine devices connect to different wireless access gateways for performing an M2M communication using short range wireless technology. It is assumed that a machine device in this context has several wireless access gateways within reach for communication, and the M2M server is able to control which one to use for the imminent M2M communication.

This can be accomplished if the machine device first detects which wireless access gateways are reachable for communication, at least technically, and then identifies the reachable wireless access gateways to the M2M server, whereby the M2M server can select one or more of them as being prioritized, based on their current state, and send an indication of the prioritized gateways to the machine device. For example, the M2M server may assign priorities to the gateways based on various "constraints" of the gateways e.g. related to access control restrictions, capability, capacity and current traffic load. The machine device will then first and foremost connect to a prioritized wireless access gateway, if possible, for performing the M2M communication. In this way, the M2M server can make the machine device connect to a "suitable" wireless access gateway and avoid any "unsuitable" wireless access gateways, e.g. with respect to service performance and network utilization.

Figure 1:
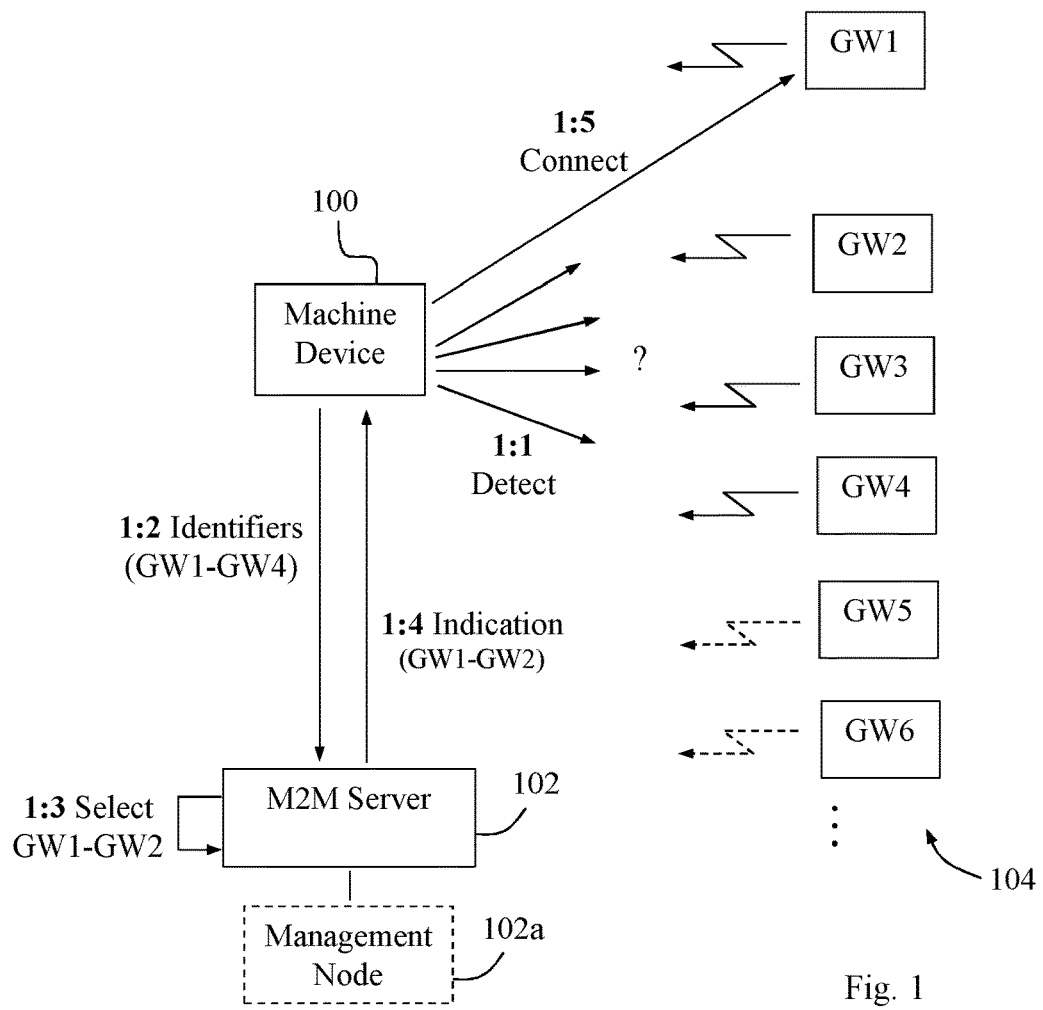
FIG. 1 is a communication scenario where a machine device connects to a wireless access gateway, in accordance with some possible embodiments.

An example of how the solution can be employed will now be described with reference to the communication scenario of FIG. 1 involving a machine device 100, an M2M server 102 and a plurality of wireless access gateways 104. Throughout this description, the machine device and the M2M server may be the above-mentioned LWM2M Client and LWM2M Server, respectively. Further, the functionality of the M2M server 102 described herein may in practice be implemented in a single node or in more than one node with distributed or shared functionality. For example, the functionality of M2M server 102 may be realized by an LWM2M Server which communicates with the machine device 100 and by a management node 102a which has the intelligence and control ability for selecting which wireless access gateway(s) shall be assigned as prioritized for the machine device 100. Further, the M2M server 102 may be implemented in a centralized node arranged in "the cloud" and/or in the Internet, or in one of the wireless access gateways.

In this procedure it is assumed that the machine device 100 is located in an area where several wireless access gateways 104 are operating for use in M2M communications, and that the device 100 is about to execute an M2M communication session but has not yet established one with any of the gateways. It is also assumed that the machine device 100 is able to connect to any of the wireless access gateways 104, at least technically, if it is close enough for short range wireless communication with the machine device 100. Each gateway 104 has thus the ability to act as an access point for M2M communication. In this disclosure, if a wireless access gateway is close enough to the machine device 100 so that the latter is able to properly detect, i.e. "hear", wireless signals transmitted therefrom, the gateway is said to be "reachable". In other words, a reachable wireless access gateway is one that the machine device is able to reach for communication using short range wireless technology.

A first action 1:1 illustrates that the machine device 100 basically searches for reachable wireless access gateways 104 within "hearing distance", which gateways 104 are more or less continuously, or at least at very frequent intervals, transmitting signals comprising suitable identifiers that the machine device 100 can intercept from any reachable wireless access gateways. This action may be performed such that the device 100 scans over a given frequency range so as to "listen" to any signals with identifiers being transmitted from these gateways 104 within that frequency range, which gateways may use different frequencies for transmission that can be scanned by the machine device 100.

In this example, the machine device 100 manages to detect signals with identifiers from four gateways GW1, GW2, GW3 and GW4, which are thereby considered to be reachable to the device 100. In a conventional procedure, the machine device 100 would at this point just connect to one of the gateways GW1-GW4, either randomly, or to the first gateway that is detected, or to one particular gateway if it has been predefined in the machine device 100 as "preferred" gateway or similar. In this solution, however, the machine device 100 instead sends the identifiers of the detected and reachable wireless access gateways GW1-GW4 to the M2M server 102, in an action 1:2, thereby allowing the M2M server 102 to evaluate the gateways GW1-GW4 and control which one the device 100 should preferably connect to and/or which one(s) the device 100 should not connect to. It should be noted that the messages exchanged in this procedure between the device 100 and the M2M server 102, see actions 1:2 and 1:4, may be communicated over an arbitrary wireless access gateway that may not necessarily be used in the imminent M2M communication as such.

Another action 1:3 illustrates accordingly that the M2M server 102 selects two prioritized wireless access gateways GW1 and GW2 from the reachable wireless access gateways GW1-GW4 received in the preceding action 1:2. In this context the term "prioritized" implies that one of those gateways GW1-GW4 should be used by the machine device 100 for the imminent M2M communication. In this action, the M2M server 102 determines which wireless access gateway(s) to be prioritized based on a current state of the reachable wireless access gateways GW1-GW4. For example, the wireless access gateways 104 may have certain "constraints" which may make them either suitable or unsuitable for the imminent M2M communication. Some illustrative but non-limiting examples of such constraints in the gateways may include limited operational capacity, e.g. in terms of processor power, battery and memory size, and limited bandwidth which may be more or less occupied by other already connected communicating machine devices, not shown. The gateways constraints may also relate to certain access control restrictions, e.g. allowing certain types of devices to be connected only under certain conditions.

The M2M server 102 then sends an indication of the selected prioritized wireless access gateways GW1, GW2 to the machine device 100, in an action 1:4. Thereby, the machine device 100 is enabled to connect to one of the prioritized wireless access gateways GW1, GW2 for performing the M2M communication provided that this wireless access gateway is available. In this example, the machine device 100 manages to connect to gateway GW1, in a final shown action 1:5.

The messages in actions 1:2 and 1:4 may be communicated using the above-mentioned protocol CoAP, and the standard OMA LWM2M may also generally be used throughout the examples in this disclosure. Further, the wireless access gateways may in this communication be identified by respective network addresses such as Medium Access Control, MAC, addresses, and action 1:2 may include network addresses of gateways GW1-GW4 and action 1:4 may include network addresses of gateways GW1, GW2. Alternatively, gateways GW1-GW4 may have abbreviated codes or the like defined by the machine device 100 in action 1:2, e.g. GW1 may simply be called "1", GW2 may be called "2", and so forth, so that M2M server 102 can simply return "1" and "2" as the indication in action 1:4.

In general, the M2M server 102 may even assign different priorities to two or more wireless access gateways, that is in a ranking fashion, so that the machine device 100 is effectively instructed to attempt to connect to the prioritized wireless access gateways one by one based on their priorities, e.g. specified in a ranking list, starting with the one with highest priority, until a successful connection can be established. This can also be expressed such that the machine device 100 connects to a wireless access gateway with "highest possible" priority, i.e. the first available gateway in the ranking list. Thus in the above example gateway GW1 may have the highest priority and gateway GW2 may have a lower priority, i.e. the "next highest" such that the machine device would connect to gateway GW2 with the next highest priority if gateway GW1 with the highest priority is unavailable. It is also possible that more than one wireless access gateway have the same priority in the ranking list.

An example of how the solution may be employed will now be described with reference to the flow chart in FIG. 2 which illustrates a procedure with actions performed by a machine device, to accomplish the functionality described above. The machine device is operative to connect to a wireless access gateway in order to perform a Machine-to-Machine, M2M, communication in a network, e.g. in the manner described above for machine device 100.

A first action 200 illustrates that the machine device detects a set of reachable wireless access gateways which the machine device is able to reach for communication using short range wireless technology, e.g. as described for action 1:1 above. The machine device then sends identifiers of the reachable wireless access gateways to an M2M server, e.g. as described for action 1:2 above, in an action 202. Another action 204 illustrates that the machine device receives from the M2M server an indication of at least one prioritized wireless access gateway which the M2M server has/have selected from the reachable wireless access gateways. Action 204 may be performed as described for action 1:4 above. The machine device further connects to one of the at least one prioritized wireless access gateway for performing the M2M communication using short range wireless technology, provided that this wireless access gateway is available, in a final shown action 206.

It is an advantage of this solution that the M2M node is able to control the machine device to connect to a suitable wireless access gateway and avoid any unsuitable wireless access gateways, e.g. with respect to service performance and/or network utilization. If this solution is employed for several machine devices it is possible for the M2M node to coordinate their choices of gateway for connection so that the network utilization can be optimized e.g. by employing load balancing over the wireless access gateways, to be exemplified and described in more detail below. Another advantage is that the machine device can get adequate service performance by connecting to a suitable wireless access gateway as prioritized by the M2M node. Several optional embodiments of this procedure are possible and some examples will now be described. It should be noted that these embodiments can be used in any combination and independently of one another, unless otherwise indicated.

In some possible embodiments, the short range wireless technology may be based on WiFi or Bluetooth. In another possible embodiment, the wireless access gateways may be identified by network addresses such as MAC addresses.

In another possible embodiment, the received indication may identify a plurality of prioritized wireless access gateways which are ranked, i.e. ordered or arranged, according to priority, e.g. in the form of a ranking list or similar. In this embodiment, the machine device may connect to a wireless access gateway with highest possible priority, among the prioritized wireless access gateways. If this embodiment is employed the machine device may, in another possible embodiment, connect to a wireless access gateway with a next highest priority if the wireless access gateway with highest priority is unavailable. In another possible embodiment, the machine device may attempt to connect to the prioritized wireless access gateways one by one based on their priorities, until a successful connection can be established.

Figure 2:
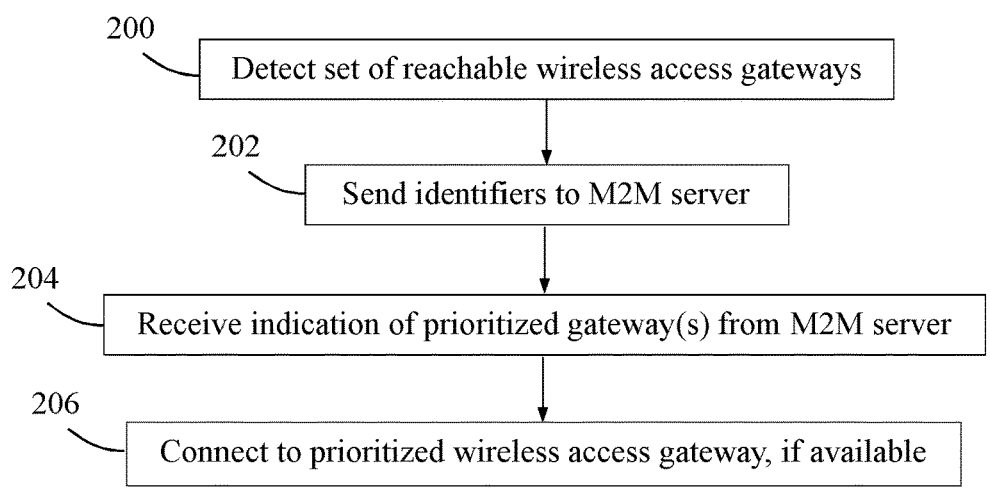
FIG. 2 is a flow chart illustrating a procedure in a machine device, according to further possible embodiments.
Figure 3:
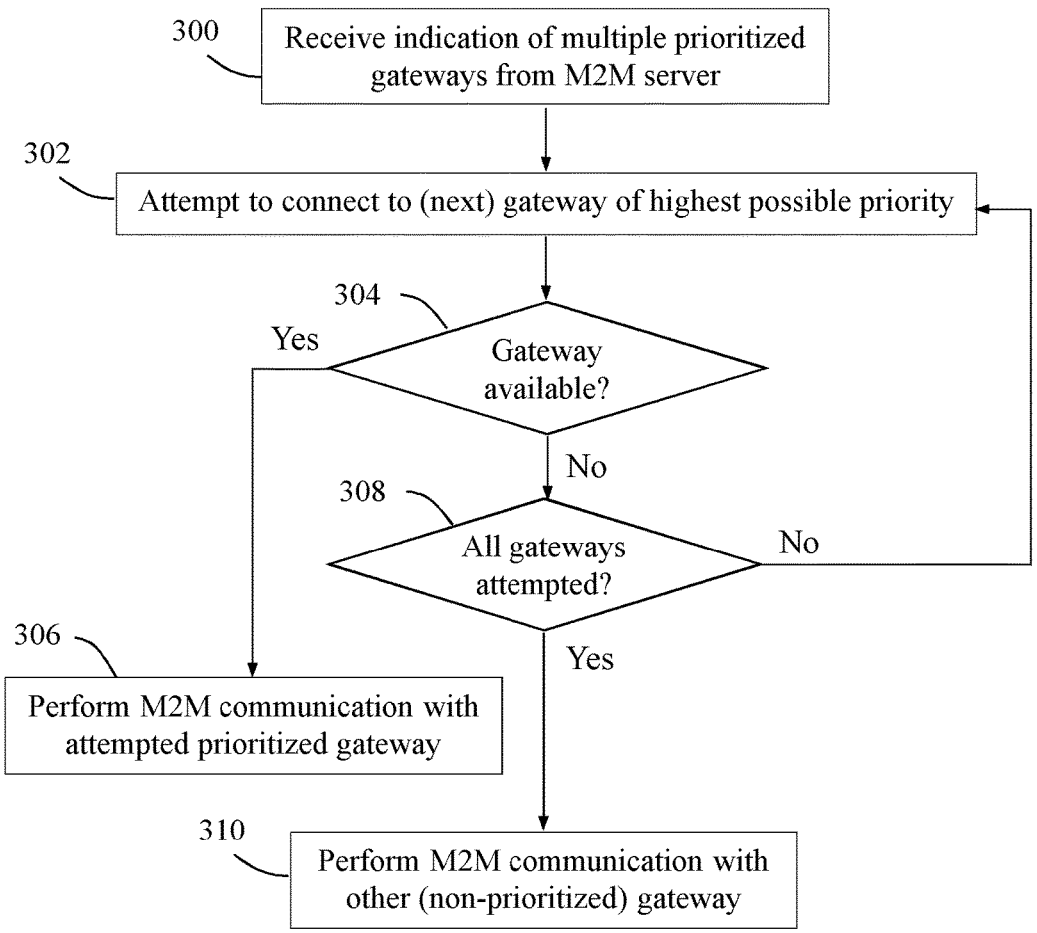
FIG. 3 is a flow chart illustrating a more detailed example of a procedure in a machine device, in accordance with further possible embodiments.

A simple example of the above embodiments will now be described with reference to the flow chart in FIG. 3 illustrating another procedure with actions performed by a machine device, basically in the same context as the examples of FIGS. 1 and 2, in order to perform an M2M communication. In a first shown action 300, the machine device receives from the M2M server an indication of prioritized wireless access gateway which the M2M server has selected from a set of reachable wireless access gateways, e.g. after actions 1:1-1:3 or 200-202 have been executed in the manner described above. Action 300 thus corresponds to actions 1:4 and 204, respectively.

For example, the indication from the M2M server may indicate that one gateway GW1 has the highest priority 1, another gateway GW2 has a next highest priority 2, another gateway GW3 has a priority 3 lower than 2, and so forth, which may be specified in a ranking list being the indication of action 300. The machine device first attempts to connect to GW1 with the highest priority 1, in an action 302. If GW1 is found to be available in a following action 304, the machine device will perform the M2M communication using a connection with the attempted prioritized wireless access gateway, in this case GW1, in an action 306.

However, if GW1 was found to be unavailable in action 304 in that the connection attempt is denied, e.g. due to lack of equipment capacity or radio bandwidth or other constraint in GW1, the machine device must attempt to connect to another wireless access gateway. Therefore, the machine device will first check if all the prioritized wireless access gateways have been attempted, in an action 308. If there are more prioritized gateways left that have not yet been attempted, the machine device returns to action 302 and attempts to connect to the next gateway, in this case GW2 in the ranking list having the next highest priority 2. If GW2 is available in action 304, the machine device will perform the M2M communication over GW2, in an action 306. But if also GW2 is unavailable in action 304, the machine device will again return to action 302 and attempt to connect to GW3 with the next highest priority 3.

If the outcome of action 304 is negative for all the prioritized wireless access gateways that were indicated in action 300, the machine device will determine in action 308 that all the prioritized wireless access gateways have been attempted. Hence, none of the prioritized wireless access gateways was available for connection with the machine device. In that case the machine device may proceed to another action 310 and perform the M2M communication with another one of the reachable wireless access gateways that was not indicated as prioritized by the M2M server, i.e. not included in the indication of action 300. In further possible embodiments, the machine device may thus connect to a predefined or arbitrary wireless access gateway not indicated as prioritized by the indication from the M2M sever, if all of the prioritized wireless access gateways are unavailable. For example, the machine device may be configured with one or more predefined or "default" wireless access gateways which the device may use for M2M communication in case there are no prioritized wireless access gateway(s) available. If the predefined wireless access gateway(s) is/are unavailable as well, or not reachable, the device may use an arbitrary wireless access gateway for the M2M communication, thus being a "fallback" alternative, provided that it is both reachable and available.

In further possible embodiments, the machine device may change the set of reachable wireless access gateways, e.g. if the machine device has moved its position, or if any of the reachable wireless access gateways has been shut down or moved out of reach, or if a new wireless access gateway has been activated or moved within reach so that the device is able to detect it. The machine device may thus change the set of reachable wireless access gateways by adding a new detected reachable wireless access gateway and/or removing a wireless access gateway that has become unreachable. In either case, the machine device also notifies the M2M server about the changed set of reachable wireless access gateways, thereby enabling the M2M server to correspondingly add or remove a gateway in the prioritized list or the like, if needed, and send a new updated indication of prioritized wireless access gateways to the machine device.

In yet another possible embodiment, the machine device may receive from the M2M server a wildcard indicating at least one further prioritized wireless access gateway that the machine device can connect to if it becomes reachable. In other words, this wildcard may specify, e.g. by a network address or other identification, one or more wireless access gateways which are not currently included among the reachable wireless access gateways and which can potentially be included as a prioritized wireless access gateway in case it should become reachable to the machine device.

It should be noted that in the above embodiment, more than one such wildcards may be received from the M2M server and the embodiment is not limited in this respect. For example, the wildcard may specify a Service Set Identifier, SSID, which may be valid for a group of gateways, e.g. having different MAC addresses but belonging to the same network area or the like, or a Basic SSID, BSSID, which is valid for one individual gateway.

Figure 4:
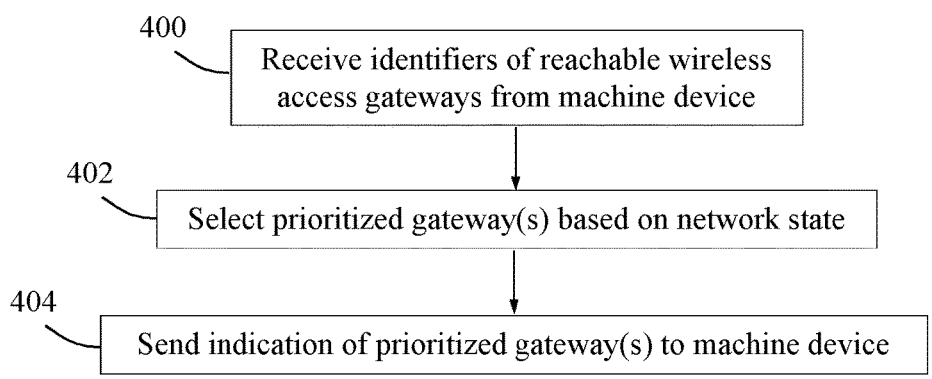
FIG. 4 is a flow chart illustrating a procedure in an M2M server, according to further possible embodiments.

A further example of how the solution may be employed will now be described with reference to the flow chart in FIG. 4 which illustrates a procedure with actions performed by an M2M server, to accomplish the functionality described above, such as in the M2M server 102 of FIG. 1. The M2M server is operative for enabling a machine device to connect to a wireless access gateway in order to perform an M2M communication in a network.

A first action 400 illustrates that the M2M server receives from the machine device identifiers of a set of reachable wireless access gateways which the machine device is able to reach for communication using short range wireless technology. In a next action 402, the M2M server selects at least one wireless access gateway from the reachable wireless access gateways as prioritized, based on a current state of the reachable wireless access gateways. A final shown action 404 illustrates that the M2M server sends an indication of the selected at least one prioritized wireless access gateway to the machine device, thereby enabling the machine device to connect to one of the at least one prioritized wireless access gateway for performing the M2M communication provided that this wireless access gateway is available. Some examples of how the machine device can select and connect to a prioritized wireless access gateway have been presented and explained above.

Several optional embodiments of this procedure are possible as well and some examples will now be described. It should be noted that these embodiments can be used in any combination and independently of one another, unless otherwise indicated. The embodiments of this server procedure can also be used in combination with any of the above-described embodiments of the procedure executed by the machine device, whenever appropriate.

In a possible embodiment, the sent indication may identify a plurality of prioritized wireless access gateways ranked according to priority, such that the machine device is enabled to connect to a wireless access gateway with highest possible priority. Some examples of how the wireless access gateways may be ranked according to priority have been presented and explained above. In another possible embodiment, the M2M server may in that case assign said priorities to the wireless access gateways based on constraints of the wireless access gateways. Some illustrative but non-limiting examples of gateway constraints have been presented and explained above.

In further possible embodiments, the M2M server may be notified by the machine device that the set of reachable wireless access gateways has been changed by adding a new reachable wireless access gateway and/or removing a wireless access gateway that has become unreachable. It has been described above how the set of reachable wireless access gateways can be changed by the machine device. In another possible embodiment, the M2M server may send to the machine device a wildcard indicating at least one prioritized wireless access gateway that the machine device can connect to if it becomes reachable. Some examples of such a wildcard have been presented and explained above.

Figure 5:
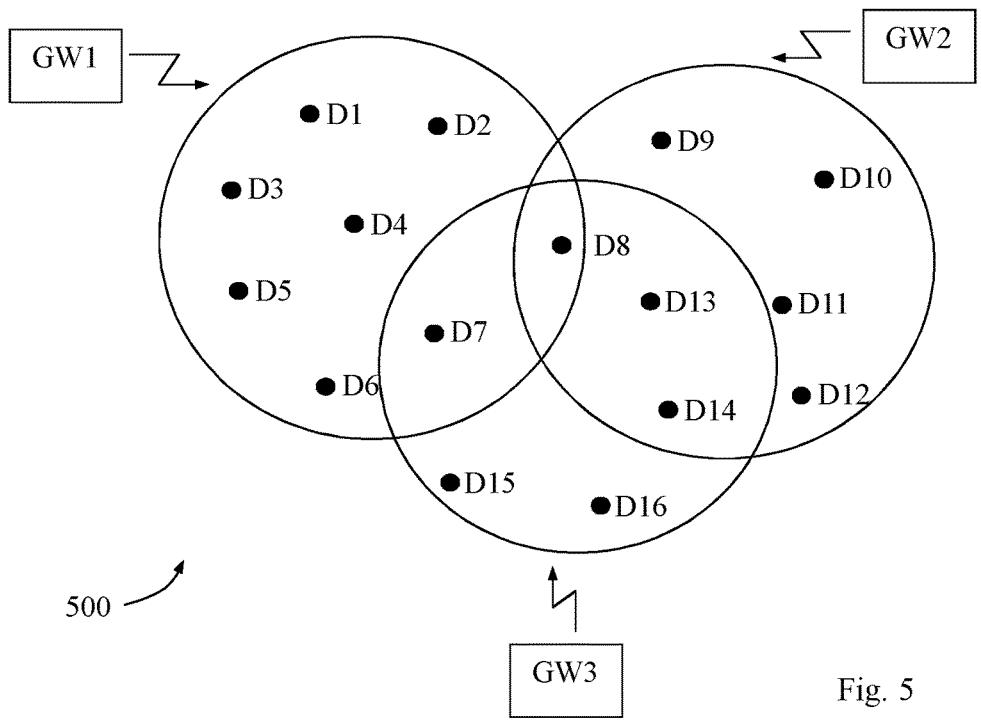
FIG. 5 is a schematic illustration of a reachability map, in accordance with further possible embodiments.

In further possible embodiments, the M2M server may maintain a reachability map indicating how different wireless access gateways in the network are reachable to multiple machine devices. In this embodiment the M2M server may select prioritized wireless access gateways for the machine devices by applying load balancing of the wireless access gateways. An example of such a reachability map that can be maintained by the M2M server is illustrated in FIG. 5 where three wireless access gateways GW1-GW3 have been specified as being reachable to various machine devices D1-D16 according to identifiers of reachable wireless access gateways that have been sent to the M2M server from each respective device, e.g. as described above for actions 1:2 and 202. Based on these identifiers from machine devices D1-D16, the M2M server can generate the reachability map 500 as shown.

It can be seen in the reachability map 500 that gateway GW1 is reachable to machine devices D1-D8, gateway GW2 is reachable to machine devices D8-D14, and gateway GW3 is reachable to machine devices D7, D8 and D13-D16. Consequently, all three gateways GW1-GW3 are reachable to machine device D8, while both gateways GW1 and GW3 are reachable to machine device D7 and both gateways GW2 and GW3 are reachable to machine devices D13 and D14. Only one gateway is reachable to the remaining machine devices.

Figure 6:
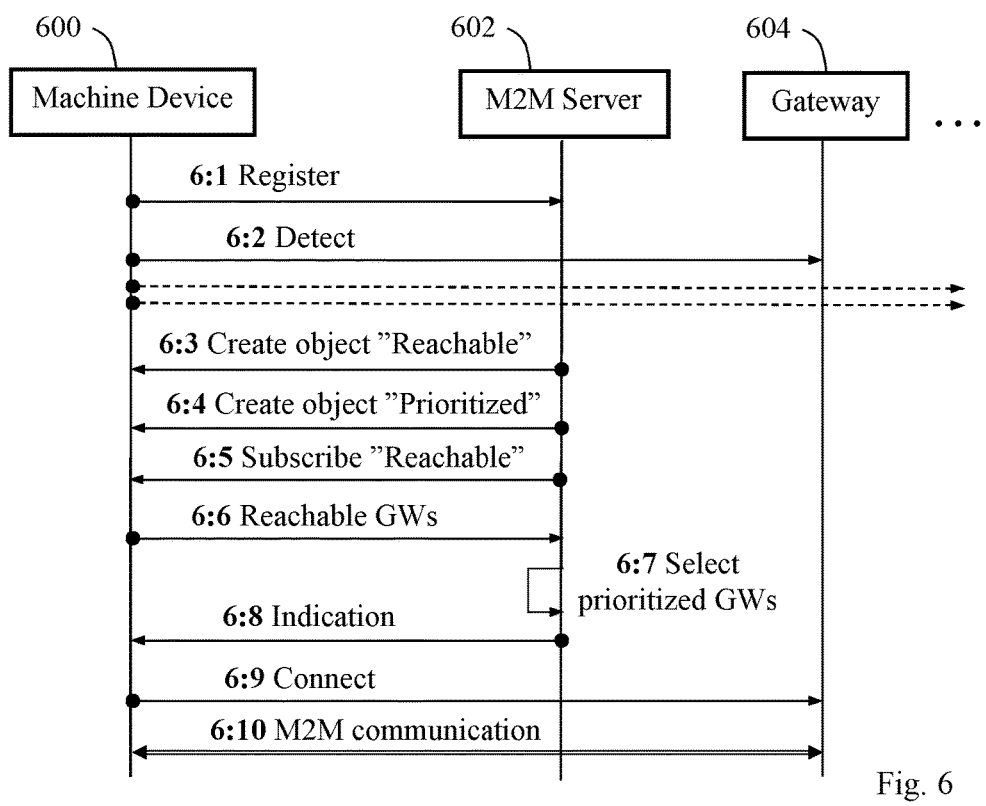
FIG. 6 is a sequence diagram illustrating an example of a procedure when the solution is used, in accordance with further possible embodiments.

With reference to the sequence diagram shown in FIG. 6, an example will now be described of how a machine device 600 can communicate with an M2M server 602 for establishing a suitable connection with a wireless access gateway 604 for M2M communication, when at least some of the above-described embodiments are used. The messages exchanged between machine device 600 and M2M server 602 are communicated over any arbitrary wireless access gateway that is both reachable and available for this initial communication setup, which is not necessarily the gateway 604 which will be used for the actual M2M communication according to the following. Further, the messages in this example may be communicated using the above-mentioned protocol CoAP although the solution is not limited thereto. The M2M server 602 may be comprised of an LWM2M server and a management node, or just a single server node, to mention some non-limiting examples.

In a first shown action 6:1, the machine device 600 registers with the M2M server 602 which can be seen as a "delegation" from the device 600 to the M2M server 602 of the decision as to which gateway to use. Before this initial action starts, the machine device 600 typically performs a bootstrapping procedure which means that the device 600 acquires configuration data from a bootstrap server, not shown, which is a regular routine outside the process described herein of selecting a gateway for M2M communication. The bootstrap server may be an LWM2M bootstrap server as described in the above background section.

A following action 6:2 indicates that the machine device 600 at some point searches for reachable wireless access gateways, basically in the manner described above for actions 1:1 and 200. It is assumed that the device 600 is able to detect a set of reachable wireless access gateways in this action, as indicated by dashed arrows, which includes device 604 among others. This action may be basically executed continuously, or at regular intervals, throughout this procedure.

A further action 6:3 illustrates that the M2M server 602 send a message instructing the machine device 600 to create a first data object for reachable wireless access gateways so that the device 600 can maintain information about currently reachable wireless access gateways in the first data object. Initially, the first data object is empty but the device 600 "fills" it with reachable wireless access gateways as they are detected according to action 6:2. The first data object may be updated from time to time by adding or removing gateways as they become reachable or unreachable, respectively.

Another action 6:4 illustrates that the M2M server 602 sends another message instructing the machine device 600 to create a second data object for prioritized wireless access gateways so that the device 600 can maintain information about currently prioritized wireless access gateways in the second data object as indicated by the M2M server 602. Initially, the second data object is also empty but the device 600 will fill it with prioritized wireless access gateways in the following.

The M2M server 602 also sends a message to the machine device 600, in an action 6:5, which is effectively a subscription request for the information on currently reachable wireless access gateways maintained in the first data object. Thereby, the machine device 600 is commanded to send identifiers of the reachable wireless access gateways detected in action 6:2 to the M2M server 602. A further action 6:6 illustrates that the machine device 600 sends such identifiers to the M2M server 602, including an identifier of device 604, corresponding to the above-described actions 1:2 and 202. Whenever the first data object is changed by adding or removing a wireless access gateway, action 6:6 may be repeated so that the M2M server 602 is informed accordingly. Alternatively, action 6:6 may be performed at regular intervals instead.

In another action 6:7, the M2M server 602 selects at least the wireless access gateway 604 from the reachable wireless access gateways as prioritized, based on a current state of the reachable wireless access gateways, which action corresponds to the above-described actions 1:3 and 402. The M2M server 602 then sends an indication of the selected prioritized wireless access gateway(s), including gateway 604, to the machine device 600, in another action 6:8, corresponding to the above-described actions 1:4, 204 and 404. Thereby, the machine device 600 can save information about the prioritized wireless access gateway(s), including gateway 604, in the second data object.

The machine device 600 is also able to execute a procedure, e.g. as illustrated in FIG. 3, of finding a wireless access gateway that can be used for connection, based on the information saved in the second data object, in order to perform the M2M communication. Thus, an action 6:9 illustrates that the machine device 600 connects to the wireless access gateway 604 which is found to be currently available, and a final action 6:10 illustrates that the machine device 600 performs the M2M communication over gateway 604.

Figure 7:
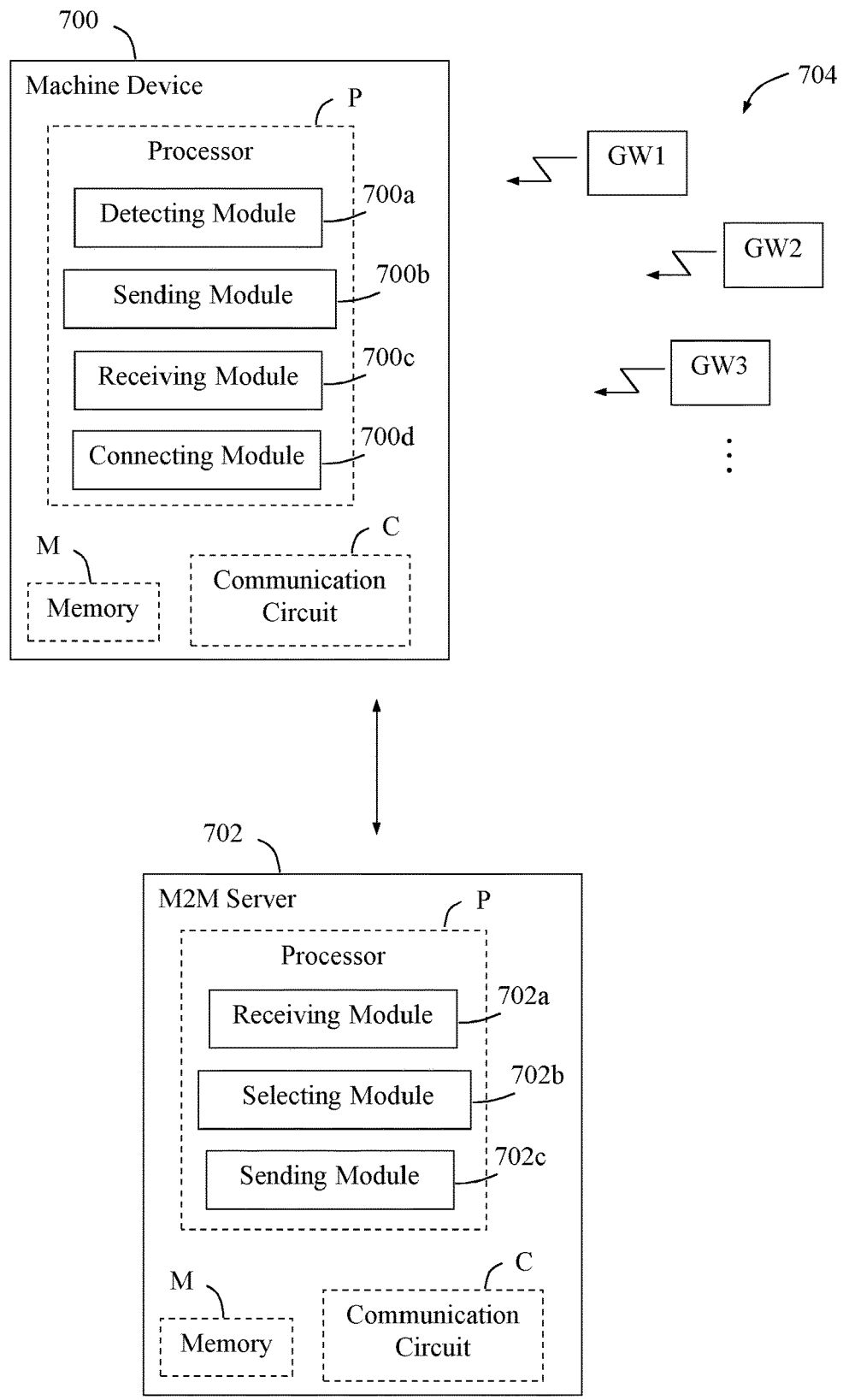
FIG. 7 is a block diagram illustrating a machine device and an M2M server in more detail, according to further possible embodiments.

The block diagram in FIG. 7 illustrates a detailed but non-limiting example of how a machine device 700 and an M2M server 702, respectively, may be structured to bring about the above-described solution and embodiments thereof. In this figure, the machine device 700 and the M2M server 702 may be configured to operate according to any of the examples and embodiments of employing the solution as described above, where appropriate, and as follows. Each of the machine device 700 and the M2M server 702 is shown to comprise a processor "P", a memory "M" and a communication circuit "C" with suitable equipment for transmitting and receiving messages in the manner described herein.

The communication circuit C in each of the machine device 700 and the M2M server 702 thus comprises equipment configured for communication with each other using a suitable protocol for the communication depending on the implementation. The solution is however not limited to any specific types of data or protocols.

The machine device 700 comprises means configured or arranged to perform at least some of the actions 200-206 and 300-310 of the flow charts in FIGS. 2 and 3, respectively, in the manner described above. Further, the M2M server 702 comprises means configured or arranged to perform at least the actions 400-404 of the flow chart in FIG. 4 in the manner described above. These actions may be performed by means of functional modules in the respective processor P in the machine device 700 and the M2M server 702 as follows.

The machine device 700 is arranged to connect to a wireless access gateway in order to perform a Machine-to-Machine, M2M, communication in a network. The machine device 700 comprises means configured to detect a set of reachable wireless access gateways 704 which the machine device 700 is able to reach for communication using short range wireless technology. This detecting operation may be performed by a detecting module 700a in the machine device 700, e.g. in the manner described for actions 1:1 and 200 above. The machine device 700 also comprises means configured to send identifiers of the reachable wireless access gateways 704 to an M2M server 702. This sending operation may be performed by a sending module 700b in the machine device 700, e.g. in the manner described for actions 1:2 and 202 above.

The machine device 700 also comprises means configured to receive from the M2M server 702 an indication of at least one prioritized wireless access gateway selected from the reachable wireless access gateways 704. This receiving operation may be performed by a receiving module 700c in the machine device 700, e.g. in the manner described for actions 1:4 and 204 above. The machine device 700 also comprises means configured to connect to one of the at least one prioritized wireless access gateway for performing the M2M communication, provided that this wireless access gateway is available. This connecting operation may be performed by a connecting module 700d in the machine device 700, e.g. in the manner described for actions 1:5 and 206 above.

The M2M server 702 is arranged to enable a machine device 700 to connect to a wireless access gateway in order to perform an M2M communication in a network. The M2M server 702 comprises means configured to receive from the machine device 700 identifiers of a set of reachable wireless access gateways 704 which the machine device 700 is able to reach for communication using short range wireless technology. This receiving operation may be performed by a receiving module 702a in the M2M server 702, e.g. in the manner described for actions 1:2 and 400 above.

The M2M server 702 also comprises means configured to select at least one wireless access gateway from the reachable wireless access gateways 704 as prioritized, based on a current state of the reachable wireless access gateways 704. This selecting operation may be performed by a selecting module 702b in the M2M server 702, e.g. in the manner described for actions 1:3 and 402 above. The M2M server 702 further comprises means configured to send an indication of the selected at least one prioritized wireless access gateway to the machine device 700, thereby enabling the machine device 700 to connect to one of the at least one prioritized wireless access gateway for performing the M2M communication provided that this wireless access gateway is available. This sending operation may be performed by a sending module 702c in the M2M server 702, e.g. in the manner described for actions 1:4 and 404 above.

It should be noted that FIG. 7 illustrates various functional modules in the machine device 700 and the M2M server 702, respectively, and the skilled person is able to implement these functional modules in practice using suitable software and hardware. Thus, the solution is generally not limited to the shown structures of the machine device 700 and the M2M server 702, and the functional modules 700a-d and 702a-c therein may be configured to operate according to any of the features and embodiments described in this disclosure, where appropriate.

The functional modules 700a-d and 702a-c described above can be implemented in the machine device 700 and the M2M server 702, respectively, by means of program modules of a respective computer program comprising code means which, when run by the processor P causes the machine device 700 and the M2M server 702 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the machine device 700 and the M2M server 702 in the form of a memory having a computer readable medium and being connected to the processor P. The computer program product or memory M in each of the machine device 700 and the M2M server 702 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective machine device 700 and M2M server 702.

The solution described herein may be implemented in each of the machine device 700 and the M2M server 702 by a computer program comprising instructions which, when executed on at least one processor, cause the at least one processor to carry out the actions according to any of the above embodiments, where appropriate. The solution may also be implemented at each of the machine device 700 and the M2M server 702 in a carrier containing the above computer program, wherein the carrier is one of an electronic signal, optical signal, radio signal, or computer readable storage medium.

While the solution has been described with reference to specific exemplifying embodiments, the description is generally only intended to illustrate the inventive concept and should not be taken as limiting the scope of the solution. For example, the terms "machine device", "wireless access gateway", "M2M server", "wildcard" and "reachability map" have been used in this disclosure, although any other corresponding entities, functions, and/or parameters could also be used having the features and characteristics described here. The solution is defined by the appended claims.

The invention claimed is:

1. A method, performed by a machine device, for connecting to a wireless access gateway in order to perform a Machine-to-Machine (M2M) communication in a network, the method comprising:
    detecting a set of reachable wireless access gateways which the machine device is able to reach for communication using short range wireless technology;
    sending identifiers of the reachable wireless access gateways to an M2M server;
    receiving, from the M2M server, an indication of at least one prioritized wireless access gateway selected from the reachable wireless access gateways; and
    connecting to one of the at least one prioritized wireless access gateway for performing the M2M communication provided that this wireless access gateway is available.

2. The method of claim 1, wherein:
    the received indication identifies a plurality of prioritized wireless access gateways ranked according to priority; and
    the machine device connects to a wireless access gateway with highest possible priority provided that this wireless access gateway is available.

3. The method of claim 2, wherein the machine device connects to a wireless access gateway with a next highest priority if the wireless access gateway with highest priority is unavailable.

4. The method of claim 3, wherein the machine device attempts to connect to the prioritized wireless access gateways one by one based on their priorities, until a successful connection can be established.

5. The method of claim 4, wherein the machine device connects to a predefined or arbitrary wireless access gateway not indicated as prioritized by the indication, if all of the prioritized wireless access gateways are unavailable.

6. The method of claim 1, wherein the short range wireless technology is based on WiFi or BLUETOOTH.

7. The method of claim 1, wherein the machine device:
    changes the set of reachable wireless access gateways by adding a new detected reachable wireless access gateway and/or removing a wireless access gateway that has become unreachable; and
    notifies the M2M server about the changed set of reachable wireless access gateways.

8. The method of claim 1, wherein the machine device receives from the M2M server a wildcard indicating at least one further prioritized wireless access gateway that the machine device can connect to if it becomes reachable.

9. The method of claim 1, wherein the wireless access gateways are identified by network addresses.

10. A machine device configured to connect to a wireless access gateway in order to perform a Machine-to-Machine (M2M) communication in a network, the machine device comprising:

processing circuitry;
memory containing instructions executable by the processing circuitry whereby the machine device is operative to:
   detect a set of reachable wireless access gateways which the machine device is able to reach for communication using short range wireless technology;
   send identifiers of the reachable wireless access gateways to an M2M server;
   receive, from the M2M server, an indication of at least one prioritized wireless access gateway selected from the reachable wireless access gateways; and
   connect to one of the at least one prioritized wireless access gateway for performing the M2M communication provided that this wireless access gateway is available.

11. The machine device of claim 10, wherein:
the received indication identifies a plurality of prioritized wireless access gateways ranked according to priority; and
the instructions are such that the machine device is operative to connect to a wireless access gateway with highest possible priority provided that this wireless access gateway is available.

12. The machine device of claim 11, wherein the instructions are such that the machine device is operative to connect to a wireless access gateway with a next highest priority if the wireless access gateway with highest priority is unavailable.

13. The machine device of claim 12, wherein the instructions are such that the machine device is operative to attempt to connect to the prioritized wireless access gateways one by one based on their priorities, until a successful connection can be established.

14. The machine device of claim 13, wherein the instructions are such that the machine device is operative to connect to a predefined or arbitrary wireless access gateway not indicated as prioritized by the indication, if all of the prioritized wireless access gateways are unavailable.

15. The machine device of claim 10, wherein the short range wireless technology is based on WiFi or BLUETOOTH.

16. The machine device of claim 10, the instructions are such that the machine device is operative to:
change the set of reachable wireless access gateways by adding a new detected reachable wireless access gateway and/or removing a wireless access gateway that has become unreachable; and
notify the M2M server about the changed set of reachable wireless access gateways.

17. The machine device of claim 10, the instructions are such that the machine device is operative to receive from the M2M server a wildcard indicating at least one further prioritized wireless access gateway that the machine device can connect to if it becomes reachable.

18. The machine device of claim 10, wherein the wireless access gateways are identified by network addresses.

19. A method performed by a Machine-to-Machine (M2M) server for enabling a machine device to connect to a wireless access gateway in order to perform an M2M communication in a network, the method comprising:
receiving, from the machine device, identifiers of a set of reachable wireless access gateways which the machine device is able to reach for communication using short range wireless technology;
selecting at least one wireless access gateway from the reachable wireless access gateways as prioritized, based on a current state of the reachable wireless access gateways; and
sending an indication of the selected at least one prioritized wireless access gateway to the machine device, thereby enabling the machine device to connect to one of the at least one prioritized wireless access gateway for performing the M2M communication provided that this wireless access gateway is available.

20. The method of claim 19, wherein the sent indication identifies a plurality of prioritized wireless access gateways ranked according to priority, such that the machine device is enabled to connect to a wireless access gateway with highest possible priority.

21. The method of claim 20, wherein the M2M server assigns the priorities to the wireless access gateways based on constraints of the wireless access gateways.

22. The method of claim 19, wherein the M2M server is notified by the machine device that the set of reachable wireless access gateways has been changed by adding a new reachable wireless access gateway and/or removing a wireless access gateway that has become unreachable.

23. The method of claim 19, wherein the M2M server sends to the machine device a wildcard indicating at least one prioritized wireless access gateway that the machine device can connect to if it becomes reachable.

24. The method of claim 19, wherein the M2M server:
maintains a reachability map indicating how different wireless access gateways in the network are reachable to multiple machine devices; and
selects prioritized wireless access gateways for the machine devices by applying load balancing of the wireless access gateways.

25. The method of claim 19, wherein the wireless access gateways are identified by network addresses.

26. A Machine-to-Machine (M2M) server arranged to enable a machine device to connect to a wireless access gateway in order to perform an M2M communication in a network, the M2M server comprising:
processing circuitry;
memory containing instructions executable by the processing circuitry whereby the M2M server is operative to:
   receive, from the machine device, identifiers of a set of reachable wireless access gateways which the machine device is able to reach for communication using short range wireless technology;
   select at least one wireless access gateway from the reachable wireless access gateways as prioritized, based on a current state of the reachable wireless access gateways; and
   send an indication of the selected at least one prioritized wireless access gateway to the machine device thereby enabling the machine device to connect to one of the at least one prioritized wireless access gateway for performing the M2M communication provided that this wireless access gateway is available.

27. The M2M server of claim 26, wherein the sent indication identifies a plurality of prioritized wireless access gateways ranked according to priority, such that the machine device is enabled to connect to a wireless access gateway with highest possible priority.

28. The M2M server of claim 27, wherein the instructions are such that the M2M server is operative to assign the priorities to the wireless access gateways based on constraints of the wireless access gateways.

29. The M2M server of claim 26, wherein the instructions are such that the M2M server is operative to be notified by the machine device that the set of reachable wireless access gateways has been changed by adding a new reachable wireless access gateway and/or removing a wireless access gateway that has become unreachable.

30. The M2M server of claim 26, wherein the instructions are such that the M2M server is operative to send, to the machine device, a wildcard indicating at least one prioritized wireless access gateway that the machine device can connect to if it becomes reachable.

31. The M2M server of claim 26, wherein the instructions are such that the M2M server is operative to:
   maintain a reachability map indicating how different wireless access gateways in the network are reachable to multiple machine devices; and
   select prioritized wireless access gateways for the machine devices by applying load balancing of the wireless access gateways.

32. The M2M server of claim 26, wherein the wireless access gateways are identified by network addresses.

33. A non-transitory computer readable recording medium storing a computer program product for connecting a machine device to a wireless access gateway in order to perform a Machine-to-Machine (M2M) communication in a network, the computer program product comprising software instructions which, when run on processing circuitry of the machine device, causes the machine device to:
   detect a set of reachable wireless access gateways which the machine device is able to reach for communication using short range wireless technology;
   send identifiers of the reachable wireless access gateways to an M2M server;
   receive, from the M2M server, an indication of at least one prioritized wireless access gateway selected from the reachable wireless access gateways; and
   connect to one of the at least one prioritized wireless access gateway for performing the M2M communication provided that this wireless access gateway is available.

34. A non-transitory computer readable recording medium storing a computer program product for controlling a Machine-to-Machine (M2M) server for enabling a machine device to connect to a wireless access gateway in order to perform an M2M communication in a network, the computer program product comprising software instructions which, when run on processing circuitry of the M2M server, causes the M2M server to:
   receive, from the machine device, identifiers of a set of reachable wireless access gateways which the machine device is able to reach for communication using short range wireless technology;
   select at least one wireless access gateway from the reachable wireless access gateways as prioritized, based on a current state of the reachable wireless access gateways; and
   send an indication of the selected at least one prioritized wireless access gateway to the machine device, thereby enabling the machine device to connect to one of the at least one prioritized wireless access gateway for performing the M2M communication provided that this wireless access gateway is available.
   access gateway for performing the M2M communication provided that this wireless access gateway is available.

* * * * *